United States Patent [19]

Kuchar

[11] Patent Number: 5,067,030
[45] Date of Patent: Nov. 19, 1991

[54] SYSTEM FOR REPRODUCING PICTURE SIGNALS AND INSERTING CHARACTER SIGNALS IN THE REPRODUCED PICTURE SIGNALS

[75] Inventor: Franz Kuchar, Vienna, Austria

[73] Assignee: U.S. Philips Corporation, New York, N.Y.

[21] Appl. No.: 377,362

[22] Filed: Jul. 7, 1989

[30] Foreign Application Priority Data

Jan. 27, 1989 [AT] Austria .................................. 164/89

[51] Int. Cl.$^5$ ......................... G11B 27/02; H04N 5/78
[52] U.S. Cl. ................................... 360/14.1; 360/33.1
[58] Field of Search .................... 360/33.1, 14.1, 26, 360/37.1, 36.1, 27; 358/21 V, 310, 319, 320, 182, 183

[56] References Cited

U.S. PATENT DOCUMENTS

| | | | |
|---|---|---|---|
| 3,755,617 | 8/1973 | Ichida | 358/21 V |
| 4,172,262 | 10/1979 | Hosoya | 358/21 V |
| 4,198,651 | 4/1980 | Baiton et al. | 358/21 V |
| 4,206,473 | 6/1980 | Isono et al. | 358/21 V |
| 4,359,755 | 11/1982 | Srivastava | 358/21 V |
| 4,535,353 | 8/1985 | Turner | 358/21 V |
| 4,623,925 | 11/1986 | Tults | 358/183 |
| 4,841,363 | 6/1989 | Arms et al. | 358/183 |

OTHER PUBLICATIONS

Sasahi et al., "Sophisticated UV-Signal Processing in a Home VCR and Associated Developments", IEEE Transactions on Consumer Electronics, vol. CE-2-5-Feb. 1979, pp. 60-70.

Primary Examiner—Aristotelis Psitos
Assistant Examiner—Varsha V. Sheladia
Attorney, Agent, or Firm—Michael E. Marion

[57] ABSTRACT

A system (1) for reproducing picture signals from a record carrier (3) in the form of a tape on which the reproduced picture signals are stored in juxtaposed inclined tracks comprises a character generator (23) for inserting character signals into reproduced picture signals. The character generator (23) is enabled to insert character signals depending on a starting-pulse edge (S1 S2, S3) generated by means of a control device (25), which edge is generated at a time interval from a position-pulse edge (P1, P2, P3) which is each time generated by means of a pulse generating device (11) at the beginning of the scan of an inclined track. The line pulses (H) extracted from the reproduced picture signals are applied to the control device (25), which comprises a detector device (35) for detecting in each picture signal the same number line pulse, and the control device (25) generates the starting-pulse edge for the character generator (23) depending on each time the same detected line pulse, which ensures that insertion of the character signals by this generator is always started at the same line.

3 Claims, 2 Drawing Sheets

SYSTEM FOR REPRODUCING PICTURE SIGNALS AND INSERTING CHARACTER SIGNALS IN THE REPRODUCED PICTURE SIGNALS

BACKGROUND OF THE INVENTION

The invention relates to a system for the reproduction of picture signals from a magnetic record carrier in the form of a tape, on which the picture signals are recorded in juxtaposed inclined tracks, the system comprising at least one rotatable magnetic head for consecutively scanning the tracks, a pulse generating device which at the beginning of every scan of a track by the magnetic head generates a position-pulse edge which characterizes the position of the magnetic head relative to the beginning of a track and the picture signals recorded therein, and a character generator for inserting character signals into the reproduced picture signals at intervals determined by a starting-pulse edge generated by means of a control device at a fixed time interval from the position-pulse edge and depending on the line pulses extracted from the reproduced picture signals. Such a system is known from a commercially available magnetic-tape video recorder.

When character signals are inserted into a picture signal reproduced from juxtaposed inclined tracks, for example in order to display alphanumeric characters concurrently with the pictures corresponding to the picture signals on the display screen of a television apparatus, the starting instant, at which the character generator is activated to insert character signals into the picture signals reproduced from the record carrier and which is dictated by the instantaneous starting-pulse edge, is in principle defined arbitrarily depending on the line, i.e. the height in the picture on the display screen, where reproduction of the character should begin. In the above prior art system the starting instant dictated by the relevant starting-pulse edge is situated at always the same fixed time interval from the relevant position-pulse edge. As a result of, for example, stretch on of the record-carrier tape, disturbances in the transport of the record-carrier tape or disturbances in the rotary drive of the magnetic head the picture signals reproduced from the record carrier may be shifted in time relative to the relevant position-pulse edge. Since in the known system the time interval between the position-pulse edge and the starting-pulse edge is always selected to be fixed, the situation may occur that in the case of such shifts in time the relevant starting-pulse edge is shifted in time in relation to the line pulses in the reproduced picture signals, so that the insertion of the character signals, for example, begins at a specific line in one field of the reproduced picture signal and begins at another line in the next corresponding field. As a result of this the picture content of the inserted character signals will jump relative to the picture content of the picture signals reproduced from the record carrier in the direction of the picture height, which is annoying to an observer of the displayed picture contents.

SUMMARY OF THE INVENTION

It is an object of the invention to provide a system of the type defined in the opening sentence, in which said problems do not occur and in which the picture content of the inserted character signals does not jump relative to the picture content of the displayed picture signals. According to the invention this is achieved in that the line pulses extracted from the picture signals are, in addition, applied to the control device and in that the control device comprises a detector device for detecting the same line pulse in each of the reproduced picture signals and depending on the detected line pulse generates the starting-pulse edge for the character generator. In this way it is achieved that the instantaneous starting-pulse edge is not generated at a fixed time interval but at a variable time interval relative to the position-pulse edge depending on the occurrence of the same line pulse in each of the picture signals being reproduced, so that the insertion of the character signals into the reproduced picture signals reproduced is started in a reliable manner depending always on the same line pulse. As a result of this the display of the picture content of the inserted character signals on the picture screen of a television apparatus always begins at the same line of the picture content of the picture signals reproduced from the record carrier, which has the advantage that the picture content of the inserted character signals does not jump relative to the picture content of the reproduced picture signals.

The control device may comprise a detector device for detecting from each picture, a line pulse n, where n is an integer, which detector device first detects the relevant picture pulse in the reproduced picture signal and depending on this detects the nth line pulse from each picture for example by means of a counting stage. However, it is found to be advantageous if the detector device comprises a time-window stage which is each time started at a starting instant situated a time interval after the position-pulse edge and which remains operative for the duration of a predetermined time window, an edge-detector stage, controlled by the time-window stage, to detect the occurrence of a predetermined edge in each nth line pulse after the starting instant within the time window, a time-measurement stage for measuring the time interval between the starting instant of the time-window stage and the instant at which the predetermined edge of said line pulse occurs, and a time-correction stage which, depending on the measured time interval, shifts the starting instant of the time-window stage substantially relative to the center between the same predetermined edges of two line pulses. This results in a detector device which can operate without the use of the frame pulses, which has the advantage that even in the case of a disturbed reproduction of the picture pulses from the record carrier a correct detection of each nth line pulse is guaranteed. Moreover, this enables the detector device to be realized in a favorable manner by means of a microprocessor.

The length of the time window of the time-window stage may correspond to the time interval between a plurality of line pulses and the edge-detector stage may be constructed to detect the predetermined edge of, for example, the last line pulse appearing within the time window, but this results in a comparatively long detection time. It is found to be advantageous if the time-window stage remains operative for the duration of a time-window which is substantially equal to the time interval between two line pulses. This yields a very short detection time to detect at each interval the same line pulse, because during the time window of the time-window stage only a single line pulse occurs, whose predetermined edge is detected by means of the edge-detector stage.

An embodiment of the invention will now be described in more detail, by way of non-limitative example, with reference to the accompanying drawings.

DETAILED DESCRIPTION OF THE INVENTION

Figure 1:
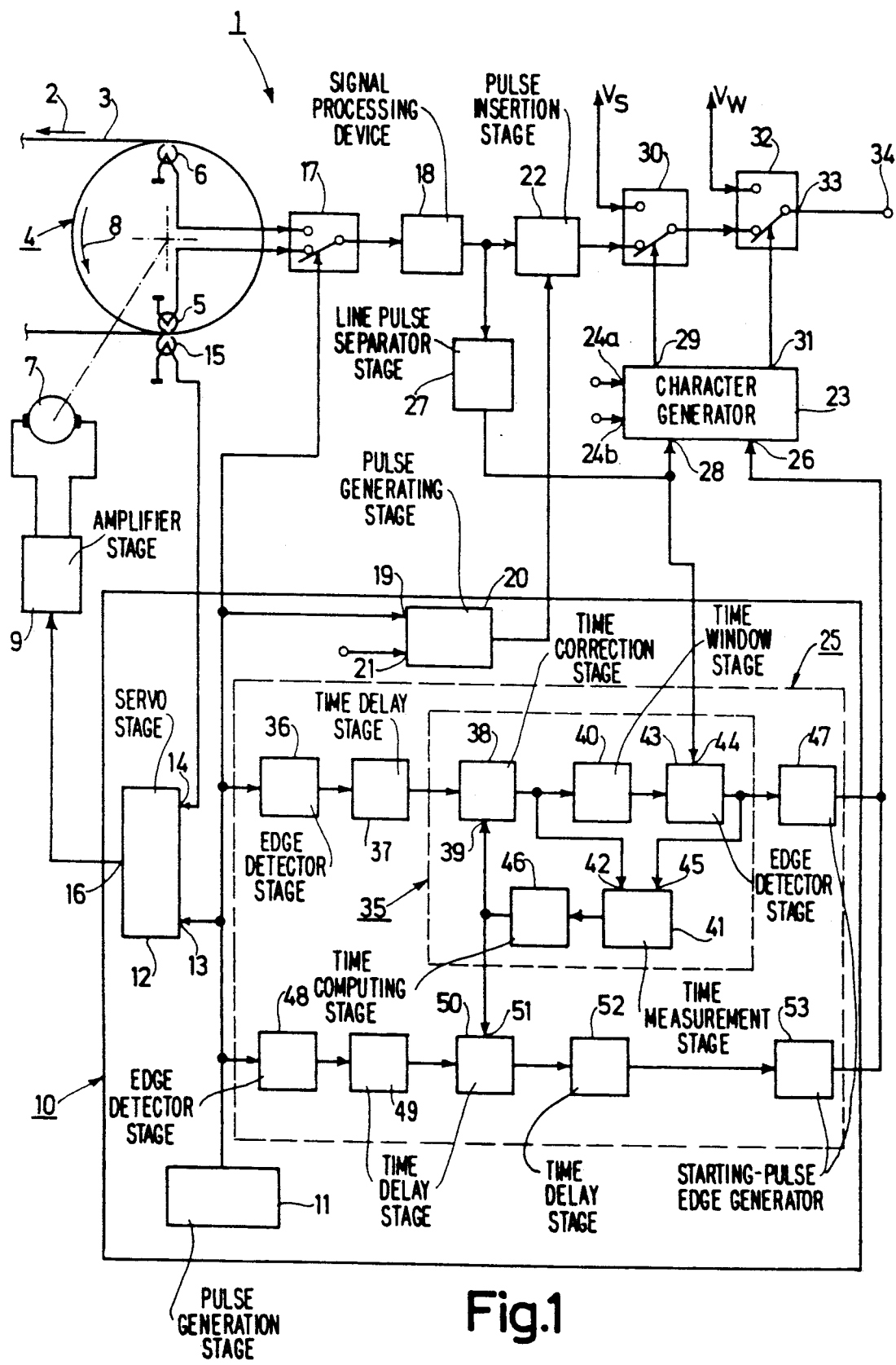
FIG. 1 shows diagrammatically the relevant parts of a system for reproducing picture signals from a magnetic record carrier in the form of a tape, which system comprises a character generator for inserting character signals into the reproduced picture signals.

FIG. 1 shows a system for reproducing picture signals from a magnetic record carrier 3 in the form of a tape which can be driven in its longitudinal direction indicated by the arrow 2, and which hereinafter is briefly referred to as "magnetic tape". Picture signals are recorded in juxtaposed inclined tracks on the magnetic tape 3, the picture signals corresponding to one field being stored in every track, as is known from the prior art system. The system 1 comprises a drum-shaped scanning device 4, around which the magnetic tape 3 is wrapped in a helical path over an angle of approximately 180° and which comprises two diametrically opposed rotatable magnetic heads 5 and 6 for consecutively scanning the inclined tracks on the magnetic tape. A motor 7 has been provided to drive the two magnetic heads 5 and 6 in a direction of rotation indicated by the arrow 8 and is energized via an amplifier stage 9.

The system 1 comprises a microprocessor 10, which performs a plurality of functions, of which only those functions which are relevant to the present invention will be described. These functions, which are realized by means of the microprocessor programmed accordingly, are described with reference to the block diagram of FIG. 1.

By means of the microprocessor 10 a pulse generation stage 11 is realized and at the beginning of each scan of an inclined track by one of the two magnetic heads 5 and 6 this stage generates a position-pulse edge P1, P2, P3, P4, resulting in a pulse train having 2 signal waveform as shown in FIG. 2a and comprising alternately rising and falling position-pulse edges. In the present system, which is constructed to reproduce picture signals in accordance with the PAL-television standard, the position-pulse edges are spaced at a constant time interval T1 of 20 ms from each other. Each of the falling position-pulse edges P1, P3 characterizes the position of the magnetic head 5 and each of the rising position-pulse edges P2, P4 characterizes the position of the magnetic head 6 relative to the beginning of a track to be scanned by the relevant magnetic head 5 or 6 and hence relative to the beginning of the picture signals which are recorded in this track and which correspond to one field. Thus, the falling position-pulse edges P1, P3 correspond to the magnetic head 5 and the rising position-pulse edges P2, P4 correspond to the magnetic head 6.

The position-pulse edges P1, P2, P3, P4 generated by means of the pulse generation stage 11 are applied to an input of a servo stage 12 realized by means of the microprocessor 10. A second input 14 of the servo stage 12 receives the output pulses of a position detector magnetic head 15, which comprises a permanent magnet, not shown, arranged on the scanning device 4 and having the same angular position as the magnetic head 5, which permanent magnet rotates and cooperates with this magnetic head and for every revolution of the two magnetic heads 5 and 6 supplies an output pulse each time that the magnetic head 5 has reached the beginning of a track to be scanned by this head. Moreover, tacho pulses, which are dependent on the number of revolutions are applied from a tacho generator driven by the motor 7 to the servo stage to control the speed of the motor 7, but this is not shown for the sake of simplicity. The servo stage 12 supplies a speed-and-face control signal to an output 16, which signal is applied to the motor 7 via the amplifier stage 9. By means of this control signal the motor 7 and hence the magnetic heads 5 and 6 are driven in such a way that the output pulses supplied by the position-detector magnetic head 15 are always in the same phase relationship to the falling position-pulse edges P1, P3 supplied by the pulse generating stage 11 and corresponding to the magnetic head 5.

Moreover, the position-pulse edges P1, P2, P3, P4 are applied to a switching device 17 arranged in the reproduction-signal path of the picture signals to control this device. By means of the switching device 17 the picture signals, which are consecutively scanned from the tracks in a field-by-field fashion by the two magnetic heads 5 and 6 and which are applied to the switching device 17 via a rotary transformer device, not shown, can be applied to a signal-processing device 18 in the reproduction-signal path, which device comprises the amplifier circuits and demodulation circuits for the picture signals reproduced from the magnetic tape. The falling position-pulse edges P1, P3 set the switching device 17 to that switching position in which the picture signals reproduced by the magnetic head 5 are applied to the signal-processing device 18, and the rising position-pulse edges P2, P4 set said switching device to that position in which the picture signals reproduced by the magnetic head 6 are applied to the signal-processing device 18.

The position-pulse edges P1, P2, P3, P4 are further applied to an input 19 of a picture-pulse generating stage 20 realized by the microprocessor 10. Depending on the position-pulse edges applied to it and depending on the reproduction mode to which the system is set, which mode can be selected from a plurality of reproduction modes of the system which differ with respect to the speed of transport of the magnetic tape, the frame-pulse generating stage 20 can generate an artificial picture pulse for every field. A control signal can be applied to a further input 21 of the picture pulse generating stage 20, which control signal corresponds to the reproduction mode to which the system 1 is set. The artificial picture pulses generated by means of the picture pulse generating stage 20 are applied to a picture pulse insertion stage 22 in the reproduction-signal path, by means of which stage the artificial picture pulses are inserted into the picture signals supplied by the signal-processing device 18, the instants at which the artificial picture pulses are inserted being selected prior to the occurrence of the picture pulses contained in the picture signals being reproduced. Such artificial picture pulses guarantee a correct synchronization of the television apparatus for displaying the picture signals reproduced from the magnetic tape in all the reproduction modes with a speed of transport of the magnetic tape which differs from the normal speed.

The system 1 further comprises a character generator 23 for the insertion of character signals, for example character signals for the generation of alphanumeric characters but also of symbols and the like. The character generator 23 comprises two control inputs 24a and 24b, to which control commands can be applied to specify which desired character signals should be inserted into the reproduced picture signals. The character generator 23 inserts the desired character signals into the reproduced picture signal depending on a starting-pulse edge, which is generated, spaced in time from the relevant position-pulse edge P1, P2, P3, P4 by a control device 25 realized by the microprocessor 10 and which is applied to a further input 26 of the character generator 23, and depending on the line pulses which are extracted from the reproduced picture signals by means of a line pulse separator stage 27 connected to the signal-processing device 18 and which are applied to a further input 28 of the character generator 23. Upon every starting-pulse edge the character generator 23 is enabled to insert character signals and the character signals are inserted line by line depending on the line pulses appearing after the starting-pulse edge. The character generator 23 controls a black-level insertion stage a 30 via its first output 29 by means of which stage a voltage Vs can be inserted in the reproduction-signal path to replace the reproduced picture signals, which voltage corresponds to the black-level of the picture signals being reproduced. Moreover, the character generator 23 controls a white level insertion stage 32 via a second output 31, by means of which stage a voltage $V_w$ can be inserted in the reproduction-signal path to replace the reproduced picture signals, which voltage corresponds to the white level of the picture signals being reproduced. By means of these two insertion stages 30 and 32 it is possible to insert character signals which are reproduced, for example, as white characters with a black lining on the display screen of a television apparatus. The reproduced picture signals and the character signals inserted therein can be applied to a television apparatus from a terminal 34, which is connected to the output 33 of the white level insertion stage 32, via further signal-processing devices, not shown, which comprise further amplifier circuits and modulation circuits. The characters reproduced on the display screen may indicate for example the mode of operation to which the system is set; for example the words "normal forward", "recording", "fast forward", "fast reverse" and the like can be formed on the display screen of a television apparatus by means of alphanumeric characters.

As can be seen in FIG. 1, the line pulses separated from the reproduced picture signals by means of the line pulse separator stage 27 are also applied to the control device 25. The control device 25 comprises a detector device 35 for detecting a selected line pulse n in each of the reproduced picture signals and, depending on each detected nth line pulse, generates the starting-pulse edge for the character generator 23, which pulse edge is applied to the input 26 of this generator. The control device 25 and the detector device 35 employed therein will be described in more detail hereinafter.

The position-pulse edges P1, P2, P3, P4 generated by the pulse generating stage 11 are also applied to the control device 25. The control device 25 comprises an edge-detector stage 36 for detecting the falling position-pulse edges P1, P3. When a falling position-pulse edge is detected the edge-detector stage 36 activates a time-delay stage 37, having a fixed delay time T2 of for example 2.3 ms. After the delay T2 the time-delay stage 37 activates a time-correction stage 38 which is also constructed as a time-delay stage but which has a delay time T3 which has a basic delay time of, for example 64 $\mu$s and which is variable, for example between zero and 128 $\mu$s, by means of a control signal applied to a control input 39 of the time-correction stage 38. After the variable delay T3 the time-correction stage 38 first activates a time-window stage 40, which is thus started at a starting instant occurring specific time interval after a falling position-pulse .edge P1, P3, and subsequently starts a time-measurement stage 41 via a control input 42 of this measurement stage. The time-window stage 40 remains operative for the duration of a given time window T4. In the present case the time-window stage 40 remains operative for a time window duration T4 which is slightly longer than the time interval between two line pulses, for example for 70 $\mu$s. The time-window stage 40 controls an edge-detector stage 43, having an input 44 to which the line pulses extracted by means of the line pulse separator stage 27 are applied. Within in its time window T4 the time-window stage 40 activates the edge-detector stage 43 to detect the occurrence of a given edge, in the present case the falling edge, of each nth line pulse after the starting instant within the time window T4. As soon as the edge-detector stage 43 detects the falling edge of the relevant, nth line pulse it supplies a control signal to the further control input 45 of the time-measurement stage 41, to stop the time-measurement stage 41, which has been started by the time-correction stage 38 via the control input 42. Thus, the time-measurement stage 41 measures and stores the time interval T5 between the starting instant of the time-window stage 40 and the instant at which the falling edge of the line pulse occurring within the time window T4 appears. The time-measurement stage 41 transfer the time interval it has measured and stored in the form of a measurement value to a time-computing stage 46, which computes a new delay time T3 for the time-correction stage 38 from the measurement value applied to it, in that it adds the value of the measured time interval T5 to the value of the previous delay T3 of the time-correction stage 38 and subtracts half the time interval between two lines pulses, i.e. 32 $\mu$s, from the resulting value. The new delay time T3 computed in the time-computing stage 46 is applied to the control input 39 of the time-correction stage 38 in the form of a control signal, so that the variable delay of the time-correction stage 38 is set to the new delay time T3. As soon as the edge-detector stage 43 has detected the falling edge of each time the same line pulse within the time window T4 it supplies, as already stated, a control signal to the further control input 45 of the time-measurement stage 41 in order to stop this stage. This control signal is also applied to a starting-pulse edge generator 47, which depending on the control signal applied to it supplies a starting-pulse edge, in the present case a falling edge, to the input 26 of the character generator 23.

The control device 25 comprises a further edge-detector stage 48 for detecting the rising position-pulse edges P2, P4. When a rising position-pulse edge P2, P4 is detected the further edge-detector stage 48 activates a time-delay stage 49 having a fixed delay T2 corresponding to the fixed delay T2 of the time-delay stage 37. After the delay T2 the time-delay stage 49 activates a further time-delay stage 50 having a variable delay T3 which corresponds to the variable delay T3 of the time-delay stage 38 and which in the same way as for this time-delay stage 38 can be varied by means of the control signal applied to a control input 51 by the time-computing stage 46. After the variable delay T3 the time-delay stage 50 activates a further time-delay stage 52 having a fixed delay time T6 of for example 32 μs. After the delay T6 the time-delay stage 52 supplies a control signal to a further starting-pulse edge generator 53, which subsequently supplies a starting-pulse edge, in the present case a falling edge, to the input 26 of the character generator 23.

Figure 2:
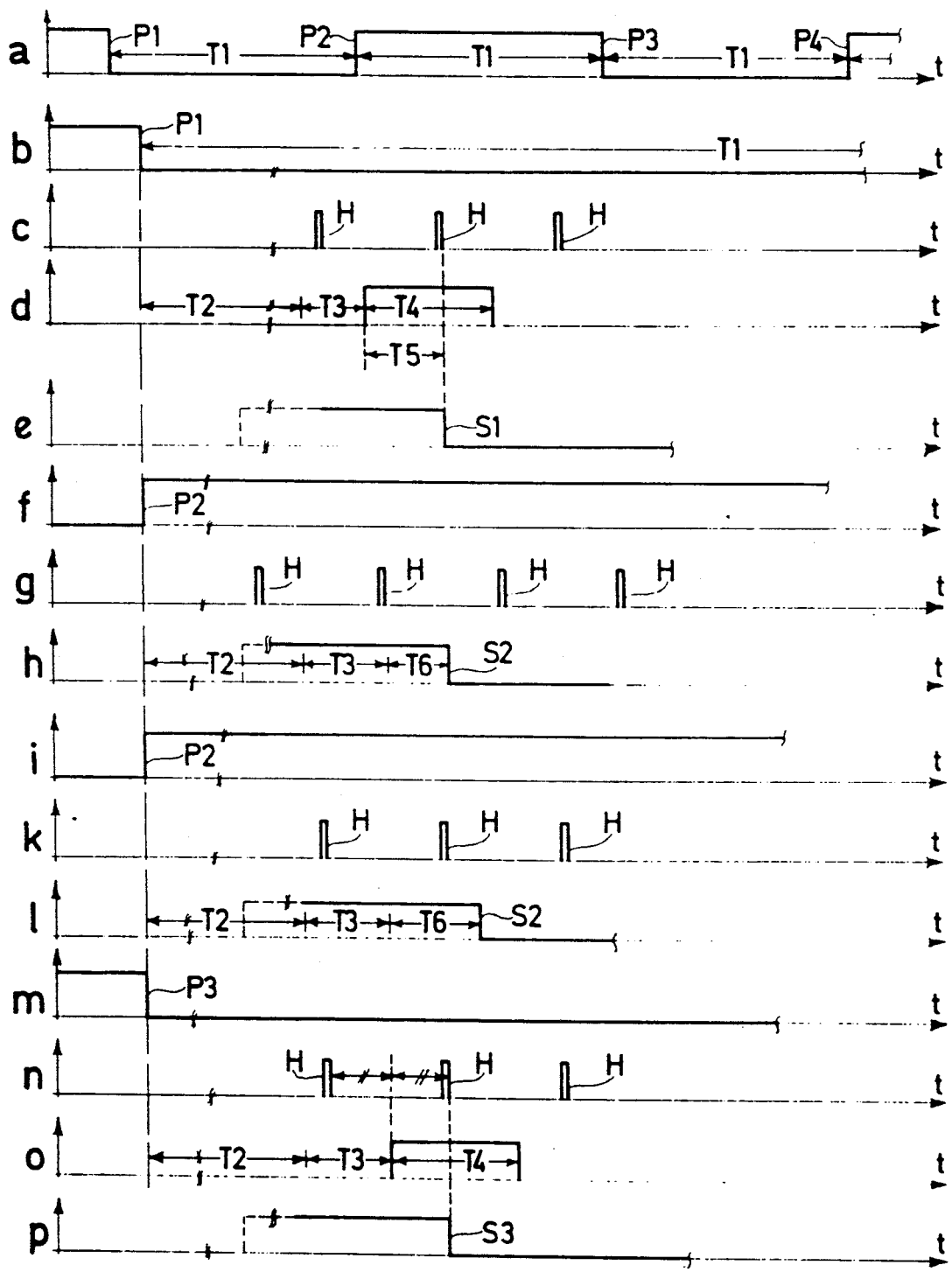
FIG. 2 shows time diagrams of signals occurring in the system shown in FIG. 1 and successively bearing the reference letters a to p.

The operation of the system 1 and in particular of the control device 25 will now be described with reference to FIG. 1 and to FIG. 2, which shows the signal waveforms. As already stated, the position-pulse edges P1, P2, P3, P4 as shown in FIG. 2a and generated by means of the pulse generating stage 11 are applied to the control device 25. The edge detector stage 36 first detects the falling position-pulse edge P1, which is shown in FIG. 2b and which corresponds to the magnetic head 5 and, consequently, to the field scanned by means of the magnetic head 5. FIG. 2c shows the line pulses H scanned by the magnetic head 5 in relation to this falling position-pulse edge P1, which line pulses are extracted from the reproduced picture signals by means of the line pulse separator stage 27 and are applied to the edge-detector stage 43. When the edge-detector stage 36 has detected the falling position-pulse edge P1, the edge-detector stage 36 activates the delay stage 37, which has a delay T2 of 2.3 ms, as is indicated in FIG. 2d. After the delay T2 the time-delay stage 37 activates the time-delay stage 38 operating as a time-correction stage, the variable delay T3 of the time-correction stage 38, as is illustrated in FIG. 2d, being instantaneously set to a value of 35 μs. Thus, after the delay T2 of the time-delay stage 37 and the delay T3 of the time-correction stage 38 this stage 38 starts the time-window stage 40 for the duration of time window T4, which is 70 μs, and the time-measurement stage 41, as is indicated in FIG. 2d. The time-window stage 40 activates the edge-detector stage 43 for the duration of the time window T4, which detector stage detects the falling edge of the line pulse H appearing within the time window T4 and, at the instant at which the falling edge appears, supplies a control signal to the further control input 45 of the time-measurement stage 41 to stop this time-measurement stage. The time-measurement stage 41 determines the time interval T5 between the starting instant of the time-window stage 40 and the instant at which the falling edge of the line pulse appears within the time window T4, as is also indicated in FIG. 2d. It is assumed, for example, that a time interval T5 of 43 μs has been measured. The time-computing stage 46 then computes the new delay T3 for the time-correction stage 38 in that it adds the value of the measured time interval T5 to the value of the previous delay time T3 and subtracts the value of half the line spacing between two line pulses therefrom. In the present case the new delay time T3 is then 46 μs. On account of this the time-computing stage 46 supplies a control signal to the time-correction stage 38 to set the delay T3 of the time-correction stage 38 to the new delay T3 of 46 μs in the present case. If the edge-detector stage 43 detects the falling edge of the line pulse H occurring within the time window T4, it also supplies a control signal to the starting-pulse-edge generator 47, which subsequently supplies a starting-pulse edge S1 to the input 26 of the character-signal generator 23 as, is shown in FIG. 2. As a result of this the character generator 23 is activated and upon the occurrence of the first line pulse H appearing after the starting-pulse-edge S1 starts the insertion of the character signals into the reproduced picture signals in conformity with the first field appearing after the occurrence of the falling position-pulse edge P1.

After this insertion into the picture signals corresponding to the first field the next position-pulse edge, namely the rising position-pulse edge P2 occurs, as is shown in FIG. 2f. FIG. 2g shows the line pulses H which are reproduced by the magnetic head 6 after the rising position-pulse edge P2 and which in an interlaced picture signal are shifted by half a line period relative to the line pulses reproduced by the magnetic head 5 after the position-pulse edge P1. By means of the further edge-detector stage 48 the rising position-pulse edge P2 is detected and subsequently the time-delay stage 49 is activated. After the delay T2 of the time-delay stage 49 the time-delay stage 50 is activated, whose variable delay is set to the previously determined delay T3 of 46 μs by the time-computing stage 46 via the control input 51. After the delay T3 the time-delay stage 50 activates the further time-delay stage 52, which after its delay T6 of 32 μs activates the further starting-pulse-edge generator 53, which subsequently applies a starting-pulse-edge S2 to the input 26 of the character generator 23, as is shown in FIG. 2h. As a result of this, the character generator 23 is activated and upon the appearance of the first line pulse H occurring after the starting-pulse-edge S2 starts the insertion of the character signals into the reproduced picture signals corresponding to the second field appearing after the occurrence of the position-pulse edge P2.

If the reproduced picture signals are not interlaced the line pulses of the second field will not be shifted in time by half a line period relative to the line pulses of the first field. This situation is illustrated in FIGS. 2i and 2k, FIG. 2i showing the rising position-pulse edge P2 corresponding to the second field and FIG. 2k showing the line pulses corresponding to the second field. In this case the delay T6 of the time-delay stage 52 is selected to be greater than described with reference to FIG. 2h, for example 48 μs, so that the starting-pulse-edge S2 produced by the starting-pulse-edge generator 48 is generated later, as is shown in FIG. 2l. This later generation of the starting-pulse-edge S2, however, is also possible in an interlaced picture signal, whose line pulses are shown in FIG. 2g.

After insertion of the character signals into the picture signals corresponding to the second field, the falling position-pulse edge P3 occurs, which edge is detected by the edge-detector stage 36 and is shown in FIG. 2m. FIG. 2n shows the line pulses H of the first field reproduced after the occurrence of the position-pulse edge P3, said line pulses being assumed to be in the same time relationship to the position-pulse edge P3 as the line pulses of FIG. 2c relative to the position-pulse edge P1. After detection of the falling position-pulse edge P3 the edge-detector stage 36 activates the time-delay stage 36. After delay T2 of the time-delay stage 37 the time-correction stage 38 is activated whose variable delay T3 is set to the new delay time T3 of 46 μs on the basis of the previously determined time values. After delay T3 the time-window stage 40 is started, as is shown in FIG. 2o. As indicated in FIGS. 2n and 2o, the starting instant of the time-window stage 40 is then shifted depending on the time interval T5, as measured and stored previously by means of the time-measurement stage 41, relative to the center between the same predetermined edges, namely the falling edges of two line pulses. Again the time-window stage 40 activates the edge-detector stage 43, which subsequently detects the falling edge of again the same line pulse H, which is then situated in the middle of the time window T4 of the time-window stage 40, because the position of the time window T4 of the time-window stage 40 has been adapted to the timing of the line pulses H by means of the time-correction stage 38, so that in a highly reliable manner always the same line pulse H in the first field of the reproduced picture signals is detected. Obviously the detector device may also be constructed in such a way that also in the second field always the same line pulse is detected. If the edge-detector stage 43 has detected the falling edge of each time the same line pulse H it again applies a control signal to the starting-pulse-edge generator 44 which subsequently generates a starting-pulse edge S3 as is shown in FIG. 2p.

As will be apparent from the above description the present system simply ensures that the start of the character signal insertion is always derived from the same line pulse, so that insertion of the character signals always begins at the same line and there will be no annoying jumping of the picture content of the character signals relative to the picture content of the picture signals reproduced from the magnetic tape.

The invention is not limited to the exemplary embodiment described above. There are a variety of further possibilities, in particular with respect to the construction of the control device and the detector device used therein for detecting each time the same line pulse. There are also other possibilities for the construction of the character generator; for example, the reproduced picture signals can be applied to the character signals generator itself and the character can be inserted into the reproduced picture signals internally in the character generator.

I claim:

1. A system for reproducing a plurality of picture signals recorded in juxtaposed inclined tracks on magnetic tape and comprising a character generator for inserting character signals into said reproduced picture signals each of which comprises a plurality of line pulses, said system further comprising:
    a) at least one rotatable magnetic head for consecutively scanning said tracks;
    b) a pulse generating device coupled to said magnetic head, for generating a position-pulse at the beginning of each scan of a track by said magnetic head;
    c) a control device comprising a detector for detecting a line pulse n, where n is an integer, from each of said picture signals, and means for generating a starting-pulse edge at a variable time interval defined by the position-pulse and the occurrence of said nth line pulse.

2. A system as claimed in claim 1, wherein said detector further comprises:
    a) means for generating a time window which begins at a starting instant within a second time interval after said position-pulse edge and which remains operative for a predetermined time;
    b) an edge detector stage, controlled by said time window means, for detecting the occurrence of a predetermined edge of each nth line pulse within said time window;
    c) a time measurement stage for measuring a third time interval between said starting instant and said occurrence of said predetermined edge; and
    d) a time correction stage which, depending on said third time interval, shifts said starting instant substantially relative to a time positioned between predetermined edges of two of said nth line pulses.

3. A system as claimed in claim 2, wherein the duration of said time window is a fourth time interval substantially equal to the time interval between two line pulses.

* * * * *